(12) United States Patent
Kunda et al.

(10) Patent No.: US 10,374,895 B2
(45) Date of Patent: Aug. 6, 2019

(54) CONFIGURATION OF COMMUNICATION INTERFACES FOR LINK AGGREGATION

(71) Applicant: Aruba Networks, Inc., Sunnyvale, CA (US)

(72) Inventors: Thiurmala Baladas Kunda, Bangalore South Taluk (IN); Madani Adjali, Fort Collins, CO (US); Srinivas Chinnam, Bangalore South Taluk (IN); Venkata Bhanu Sai Prasad Ganugapati, Bangalore Karnataka (IN); Arvind Konidala, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 15/427,118

(22) Filed: Feb. 8, 2017

(65) Prior Publication Data
US 2017/0264490 A1    Sep. 14, 2017

(30) Foreign Application Priority Data

Mar. 11, 2016  (IN) .............................. 201641008663

(51) Int. Cl.
*H04L 12/24*    (2006.01)
*H04L 12/709*   (2013.01)
*H04L 12/933*   (2013.01)

(52) U.S. Cl.
CPC ...... *H04L 41/0876* (2013.01); *H04L 41/0886* (2013.01); *H04L 45/245* (2013.01); *H04L 49/10* (2013.01)

(58) Field of Classification Search
CPC . H04L 41/0876; H04L 41/0886; H04L 49/10; H04L 45/245; H04L 12/24; H04L 12/933; H04L 12/709
USPC .................................................. 370/468, 502
See application file for complete search history.

(56) References Cited

U.S. PATENT DOCUMENTS

| | | |
|---|---|---|
| 7,155,622 B2 | 12/2006 | Mancey et al. |
| 7,869,432 B1 | 1/2011  | Mollyn |
| 8,037,324 B2 | 10/2011 | Hussain |
| 8,224,401 B1 | 7/2012  | Schlichter |
| 8,793,511 B1 | 7/2014  | Bishara |

(Continued)

FOREIGN PATENT DOCUMENTS

| | | |
|---|---|---|
| EP | 0876076 | 11/1998 |
| EP | 2242219 | 10/2010 |

OTHER PUBLICATIONS

"Planet Wireless AP Controller with 8-Port 802.3at POE+ (10)," 2015, pp. 1-8, Planet Wireless & Communication.

(Continued)

*Primary Examiner* — Man U Phan
(74) *Attorney, Agent, or Firm* — Hewlett Packard Enterprise Patent Department

(57) ABSTRACT

An example communications device may include physical communication interfaces and processing circuitry. In response to detecting that two of the physical communications interfaces are both connected to a same peer device as one another, the communications device may automatically configure the two interfaces for aggregation into the same link aggregation group. The communications device may then automatically begin negotiations with the peer device for establishment of the first link aggregation group.

13 Claims, 10 Drawing Sheets

(56) References Cited

U.S. PATENT DOCUMENTS

| | | | |
|---|---|---|---|
| 9,363,167 B2* | 6/2016 | Narasimhan | H04L 45/245 |
| 9,413,602 B2* | 8/2016 | Mohandas | H04L 41/0803 |
| 9,635,148 B2* | 4/2017 | Tewari | H04L 69/22 |
| 9,792,106 B1* | 10/2017 | Kommula | G06F 8/65 |
| 9,912,580 B2* | 3/2018 | Jayakumar | H04L 45/245 |
| 9,985,928 B2* | 5/2018 | Luo | H04L 12/467 |
| 2006/0210057 A1 | 9/2006 | Stanford | |
| 2008/0112312 A1 | 5/2008 | Hermsmeyer et al. | |
| 2009/0228626 A1 | 9/2009 | Hou et al. | |
| 2011/0211585 A1* | 9/2011 | Kodaka | H04L 45/00 370/401 |
| 2013/0315255 A1 | 11/2013 | Mullooly et al. | |
| 2014/0372576 A1 | 12/2014 | Mohandas et al. | |
| 2015/0227182 A1 | 8/2015 | Teeter | |
| 2015/0288599 A1 | 10/2015 | Zhou et al. | |
| 2016/0105306 A1* | 4/2016 | Wu | H04L 47/00 370/221 |
| 2016/0380801 A1* | 12/2016 | Xu | H04L 45/245 370/254 |
| 2017/0149653 A1* | 5/2017 | Leitner | G06F 9/45558 |
| 2018/0217833 A1* | 8/2018 | Teisberg | H04L 41/082 |

OTHER PUBLICATIONS

Extended European Search Report dated Aug. 14, 2017, EP Patent Application No. 17160029.9 dated Mar. 9, 2017, European Patent Office, 9 pages.

* cited by examiner

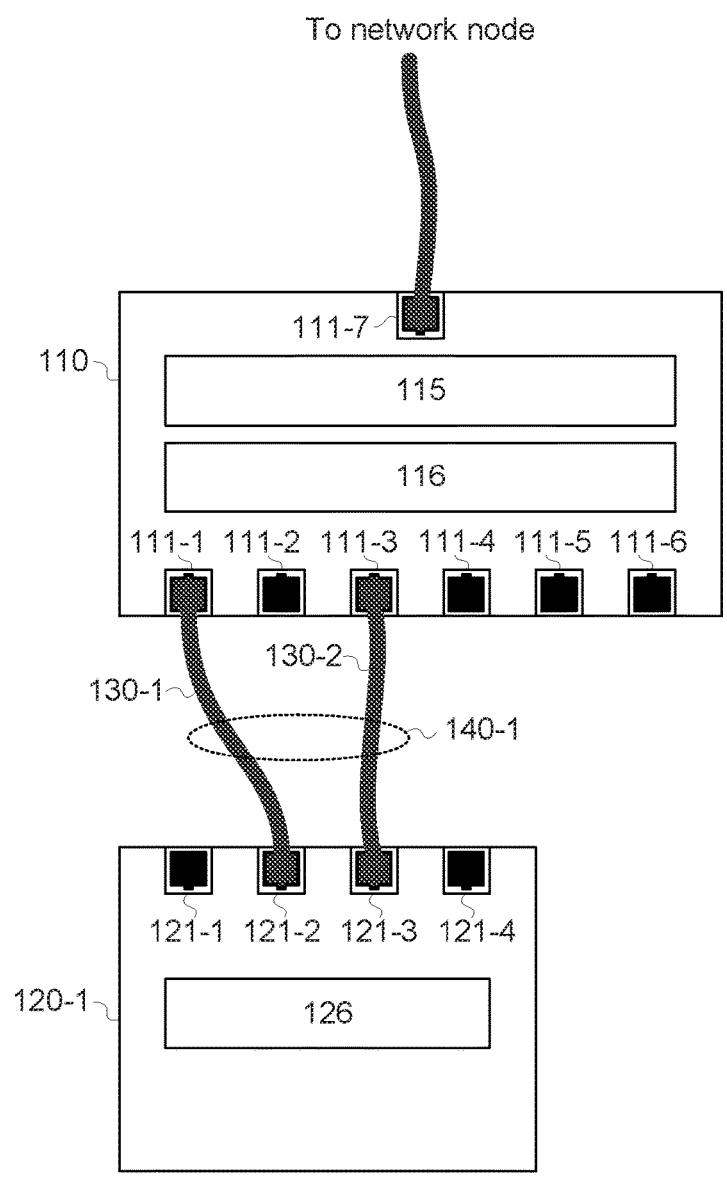

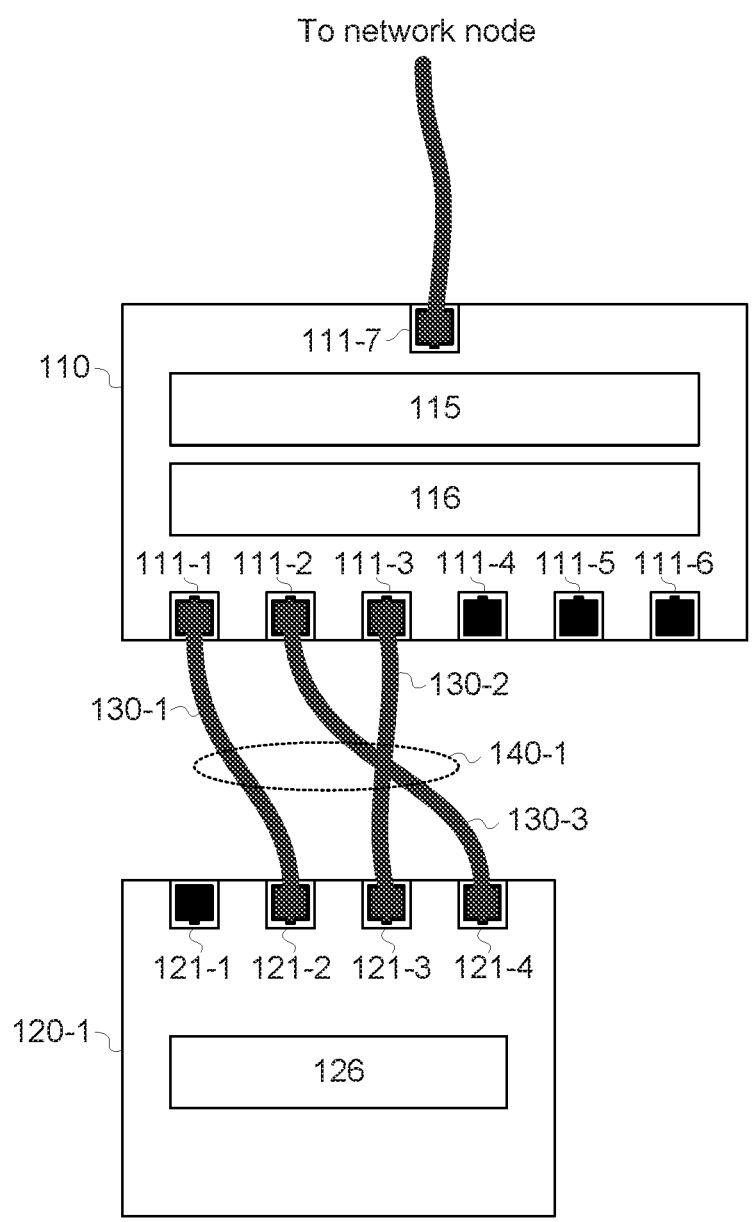

Fig. 3

| Link Aggregation Profile #1 ||
| Parameter | Set Value |
|---|---|
| Group ID | 2 |
| LACP Mode | Active |
| Priority | 255 |
| Timeout | Short |
| ⋮ | ⋮ |
| Independent State | Enabled |

CONFIGURATION OF COMMUNICATION INTERFACES FOR LINK AGGREGATION

BACKGROUND

Network devices, such as routers, switches, Ethernet power source equipment (PSE) and the like, may include multiple physical communication interfaces (sometimes referred to as "ports"). A port of one network device may be connected to a port of another device by a physical transmission medium, such as a cable, thereby forming a communications link between the two devices.

BRIEF DESCRIPTION OF THE DRAWINGS

FIG. 1A is a conceptual diagram illustrating an example system in an example arrangement.

FIG. 1C is a conceptual diagram illustrating the example system in another example arrangement.

FIG. 3 is a conceptual diagram illustrating an example profile.

DETAILED DESCRIPTION

Figure 1B:
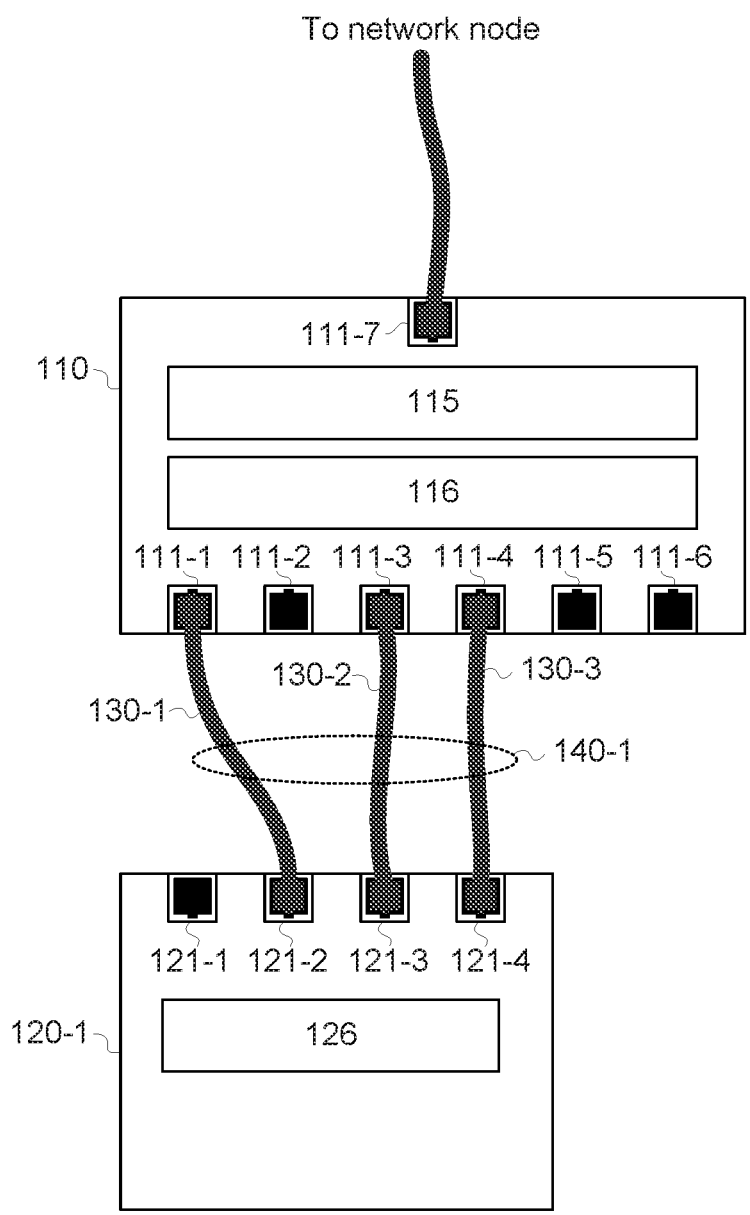
FIG. 1B is a conceptual diagram illustrating the example system in another example arrangement.

FIGS. 1A-1D illustrate an example system 100 in various example arrangements. The example system 100 illustrated in FIGS. 1A-1D includes an example network device 110 and example peer devices 120.

The network device 110 may serve as a network node to connect the peer devices 120 to other network nodes (not illustrated), which may be nodes in the same network as the network device 110 or in an external network. The network device 110 may be, for example, a switch, a PSE, a router, or the like.

The network device 110 includes physical communication interfaces 111 for communicably connecting the network device 110 to other devices, such as the peer devices 120 and the network node (not illustrated). The numbers and arrangements of physical communications interfaces 111 illustrated in FIGS. 1A-1D are merely examples, and the network device 110 is not limited to these examples. In particular, the network device 110 can have any number of physical communication interfaces 111 that is equal to or greater than two.

In some example configurations, certain physical communication interfaces 111 may be configured specifically for connecting to the network node (uplink ports), while other physical communication interfaces 111 may be configured specifically for connecting to peer devices 120 (downlink ports). In other example configurations, any of the physical communication interfaces 111 may be used for connecting to either the network node or the peer devices 120. FIGS. 1A-1D illustrate a physical communication interface 111-7 that is connected to the network node, but this is merely one example and any number of communications interfaces 111 may be connected to the network node.

The network device 110 may also include an interface controller 115 that is to configure parameters of the physical communication interfaces 111. The interface controller 115 may be hardware and/or machine-readable instructions that are configured to perform certain operations described herein. For example, the interface controller 115 may be realized by processing circuitry 151 (discussed further below) executing machine-readable instructions. The interface controller 115 may also include, for example, an application-specific integrated circuit (ASIC), a field-programmable gate array (FPGA), an application-specific instruction set processor (ASIP), or the like, configured to perform certain operations described herein.

The network device 110 may also include a link aggregator 116 that is to aggregate links. The link aggregator 116 may be hardware and/or machine-readable instructions that are configured to perform certain operations described herein. For example, the interface controller 115 may be realized by processing circuitry 151 (discussed further below) executing machine-readable instructions. The link aggregator 116 may also include, for example, an application-specific integrated circuit (ASIC), a field-programmable gate array (FPGA), an application-specific instruction set processor (ASIP), or the like, configured to perform certain operations described herein. For example, the link aggregator 116 may be hardware and/or machine-readable instructions that implement a link aggregation protocol, such as the Link Aggregation Control Protocol (LACP), IEEE 802.1AX-2008.

The peer devices 120 may be any device that can be communicably connected to the network device 110 via the physical communication interfaces 111. For example, the peer devices 120 may be a Wi-Fi access point, a network switch, a personal computer, and so on. The peer devices 120 include physical communication interfaces 121 for communicably connecting the peer devices 120 to other devices. The numbers and arrangements of physical communication interfaces 121 shown in FIGS. 1A-1D are merely examples, and any number or arrangement of physical communication interfaces 121 can be included in the peer devices 120. The peer devices 120 may also include a link aggregator 126 for aggregating links. If the link aggregator 126 of the peer device 120 implements a link aggregation protocol that is compatible with that used by the network device 110, then the network device 110 and the peer device 120 may aggregate links between them.

The network device 110 and the peer devices 121 may be communicably connected to each other by connecting a connector 130 between a physical communication interface 111 of the network device 110 and a physical communication interface 121 of the respective peer device 120. The connectors 130 may be any type of physical media that is capable of transmitting signals between the physical communication interfaces 111 and 121, such as, for example, Ethernet cables, optical fiber cables, universal serial bus (USB) cables, IEEE 1394 (Firewire) cables, and so on.

When a physical communication interface 111 of the network device 110 and a physical communication interface 121 of a peer device 120 are connected to each other by a connector 130, they form a physical communication link. A link aggregation group (LAG) 140 is a single logical communication link that is formed by aggregating multiple such physical communication links.

The network device 110 may detect whenever more than one communication links are established with the same peer device 120, and in response to detecting this, may automatically configure the links that are connected to the same peer device 120 for aggregation into the same LAG 140.

In particular, when more than one physical communication interfaces 111 are connected to the same peer device 120, the interface controller 115 may automatically configure the more than one physical communication interfaces 111 in such a manner that the link aggregator 116 will automatically begin negotiating with the peer device 120 to establish an LAG 140 that includes the links associated with the more than one physical communication interfaces 111. As used herein "begin negotiating with the peer device" means at least sending a message to the peer device 120 that is related to establishing the LAG 140. Sending an LACP packet to the peer device 120 is an example of beginning negotiating with the peer device 120. The peer device 120 may continue the negotiations by responding to the message (for example, sending back an LACP packet), and the LAG 140 may ultimately be established at the conclusion of the negotiations. Whether or not the LAG 140 is ultimately established as a result of the negotiations may depend on the configuration of the peer device 120. For example, formation of the LAG 140 may depend on whether or not the network device 111 and the peer device 120 are using the same (or compatible) protocols for link aggregation. As another example, even if the protocols being used are compatible, formation of the LAG 140 may depend on whether or not the peer device 120 has link aggregation enabled for the appropriate physical communication interfaces 121.

The interface controller 115 may specify which physical communication interfaces 111 should be included in a particular LAG 140 by configuring certain parameters of the physical communication interfaces 111. For example, the physical communication interfaces 111 may have a particular configuration parameter associated therewith that identifies which LAG 140 (if any) the physical communications interfaces 111 are assigned to, and the link aggregator 116 may determine which physical communication interfaces 111 to include in which LAGs 140 based on the values of this parameter. For example, when the link aggregator 116 implements LACP, the configuration parameter may be an LACP key (also referred to as a "group identifier", "group ID", "LAG identifier", or "LAG ID"), and physical communication interfaces 111 that have the same value for their group ID parameter are included by the link aggregator 116 in the same LAG 140 as one another.

Physical communication interfaces 111 that are not to be included in any LAG 140 (hereinafter "non-aggregated ports") may be identified by, for example, setting a flag that indicates a non-aggregated port, leaving configuration parameters related to link aggregation blank, setting configuration parameters related to link aggregation to values that indicate an non-aggregated port, or by any other technique.

The physical communication interfaces 111 that are to be included in a particular LAG 140 may also have certain other configuration parameters related to link aggregation that should be set before being included in the LAG 140. For example, when the link aggregator 116 implements LACP, such additional configuration parameters may include an LACP mode (e.g., active or passive), a priority, a timeout (e.g., short or long), an independent state parameter, and so on. The interface controller 115 automatically configures these parameters on those physical communication interfaces 111 that are to be included in a LAG 140. In particular, among those physical communication interfaces 111 that are to be included in the same LAG 140 as one another, corresponding ones of their link aggregation parameters may be set to the same respective values.

The interface controller 115 may make the aforementioned configurations by determining link aggregation profiles and applying a profile to the physical communication interface 111. A link aggregation profile may include a particular combination of values that are to be set for various configuration parameters. A conceptual example of a configuration profile is shown in FIG. 3. Applying a link aggregation profile to a physical communication interface 111 means configuring parameters of the physical communication interface 111 based on the values assigned to these parameters in the profile.

When the same link aggregation profile is applied to two physical communication interfaces 111, the physical communication interfaces 111 will be identically configured with respect to the relevant link aggregation parameters (including their group ID), and thus the link aggregator 116 will automatically attempt to include the two physical communication interfaces 111 in the same LAG 140 as one another. Thus, the interface controller 115 may indicate to the link aggregator 116 that certain physical communications interfaces 111 should be assigned to the same LAG 140 as one another by applying the same link aggregation profile to the selected physical communications interfaces 111.

As noted above, the configuration of the physical communication interfaces 111 to be in the same LAG 140 is done in response to determining that the physical communication interfaces 111 are connected to the same peer device 120 as one another. This determination may be done by detecting the identity of the peer device 120 that is connected to each physical communication interface 111, and comparing these identifies to each other. The interface controller 115 may detect the identity of a peer device 120 that is connected to a given physical communications interface 111 by any available discovery technique. For example, the Link Layer Discovery Protocol (LLDP) (also referred to as Station and Media Access Control Connectivity Discovery), IEEE 802.1AB, may be used to detect the identities of peer devices 120 connected to the physical communications interfaces 111. Other examples of discovery protocols include Cisco Discovery Protocol (CDP), Extreme Discovery Protocol, Foundry Discovery Protocol (FDP), Nortel Discovery Protocol (also known as SONMP), and Microsoft's Link Layer Topology Discovery (LLTD).

In certain examples, whether or not the peer device 120 is configured in such a way that a LAG 140 can be established as a result of the negotiations by network device 110, does not prevent the network device 110 from performing the operations described herein. For example, in response to detecting that two physical communication interfaces 111 are connected to the same peer device 120, the network device 110 may automatically configure the two physical communication interfaces 111 and begin negotiations in the manner described herein regardless of how the peer device 120 is configured in relation to link aggregation.

In certain examples, if the LAG 140 cannot be formed (i.e., the negotiation fails), then the interface controller 115 may automatically reconfigure the relevant physical communication interfaces 111 to be non-aggregated ports, for example, by returning them to a configuration they had prior to being configured to join a LAG 140.

As another example, if the LAG 140 cannot be formed and the relevant physical communication interfaces 111 were configured to have an independent state parameter enabled, then the configuration of the physical communication interfaces 111 may be left unchanged, which will result in the physical communication interfaces 111 automatically being put into an independent state in which they continue to carry traffic like a non-aggregated port but also continue to periodically send LACP packets.

As an example of the operations discussed above, consider the arrangement shown in FIG. 1A, in which there are two links between the network device 110 and the same peer device 120-1. In particular, the cable 130-1 is connected to the physical communications interfaces 111-1 and 121-2, and the cable 130-2 is connected to the physical communications interfaces 111-3 and 121-3. In response to detecting that both the physical communications interfaces 111-1 and 111-3 are connected to the same peer device 120 as one another (i.e., peer device 120-1), the interface controller 115 may automatically configure the physical communications interfaces 111-1 and 111-3 to be in the same LAG 140 as one another (i.e., LAG 140-1). For example, the interface controller 115 may automatically configure the physical communications interfaces 111-1 and 111-3 based on the same link aggregation profile, which will indicate to the link aggregator 116 that they are to be included in the same LAG 140. Once the physical communications interfaces 111-1 and 111-3 are so configured, the link aggregator 116 may automatically begin negotiating with the peer device 120-1 for establishment of the LAG 140-1.

Thus, a user does not need to identify which physical communications interfaces 111 should be aggregated into an LAG 140 or manually configure the physical communications interfaces 111 to enable them to be included in the LAG 140. Instead, a user can simply plug connectors 130 into any of the physical communications interfaces 111, and the network device 110 will automatically configure the appropriate physical communications interfaces 111 such that an LAG 140 can be formed.

The interface controller 115 may also detect changes in connections between the network device 110 and peer devices 120 after an LAG 140 has been formed, and may automatically adjust the LAG 140 based on these changes in connections (by changing the configurations of the physical communication interfaces 111).

For example, consider the arrangement shown in FIG. 1B. The arrangement shown in FIG. 1B corresponds to the arrangement shown in FIG. 1A, with the addition of a new link between the network device 110 and the peer device 120-1. In particular, in a state in which two links between the network device 110 and the peer device 120-1 have already been aggregated into the LAG-1 (see FIG. 1A), a new link with the peer device 120-1 is formed when the connector 130-3 is newly connected to the physical communications interfaces 111-4 and 121-4. In response to detecting that the physical communications interface 111-4 is newly connected to the same peer device 120 as the other existing links (i.e., peer device 120-1), the interface controller 115 may automatically configure the physical communications interface 111-4 to be added to the LAG 140-1, which already includes the other two links to the peer device 120-1. For example, the interface controller 115 may configure the physical communications interface 111-4 based on the same link aggregation profile that was previously used to configure physical communications interfaces 111-1 and 111-3, which will signal to the link aggregator 116 that the physical communications interface 111-4 is to join LAG 140-1.

As another example, consider the arrangement shown in FIG. 1C. The arrangement shown in FIG. 1C corresponds to the arrangement shown in FIG. 1B with the following change: the connector 130-3 has been disconnected from the physical communications interface 111-4 and moved to the physical communications interface 111-2. In response to detecting that the physical communications interface 111-4 is disconnected from the peer device 120-1, the interface controller 115 may automatically configure the physical communications interface 111-4 to be removed from the LAG 140-1. For example, parameters of the physical communications interface 111-4 may automatically be reset to the values they had prior to being configured for including in the LAG 140-1, the parameters of the physical communications interface 111-4 may be set to default values for a non-aggregated port, or a profile for non-aggregated ports may be applied to the physical communications interface 111-4. In response to detecting that the physical communications interface 111-2 is newly connected to the same peer device 120 as the other two existing links (i.e., peer device 120-1), the physical communications interface 111-2 may automatically be configured so as to be added to the LAG 140-1. For example, the interface controller 115 may automatically configure the physical communications interface 111-2 based on the same link aggregation profile that was used to configure physical communications interfaces 111-1 and 111-3, which will signal to the link aggregator 116 that the physical communications interface 111-2 is to join LAG 140-1. In the time between the disconnection of the connector 130-3 and the reconnection of the connector 130-3 to a new port, the LAG 140-1 may continue to operate as an aggregate link, albeit with only two links instead of the previous three links.

Thus, a user can add new links between the network device 110 and the peer device 120 or move links between different ports, and the LAG 140 will automatically be updated to include the new links or the new configuration of links. In order to add a new link to an existing LAG 140, the user does not need to configure any physical communication interfaces 111 or take any other special steps besides plugging in a new connector 130, since the interface controller 115 will automatically detect the new link and appropriately configure the physical communication interfaces 111. Similarly, when a user moves an existing link to a new port, the user does not have to take any special steps to change a configuration of the now-disconnected physical communication interface 111, or to change a configuration of the newly connected physical communication interface 111, since the physical communication interfaces 111 are automatically configured in such a way that the LAG 140-1 are automatically adjusted to account for the changes in link arrangement.

The interface controller 115 may also detect when the network device 110 is connected to multiple peer devices 120, and may automatically create different LAGs 140 for the different peer devices 120 (by changing the configurations of the physical communication interfaces 111). In particular, whenever two or more peer devices 120 are connected to the network device 110, the network device 110 may establish different LAGs 140 for each one of the peer devices 120 that has more than one link with the network device 110. For any peer devices 120 that have only one link to the network device 110, their link is not included in any LAG 140. In other words, links associated with different peer devices 120 are not aggregated into the same LAG 140 as one another, and all links to the same peer device 120 are aggregated into the same LAG 140 as one another (unless there is only one link for that peer device 120, in which case it remains a non-aggregated link).

Figure 1D:
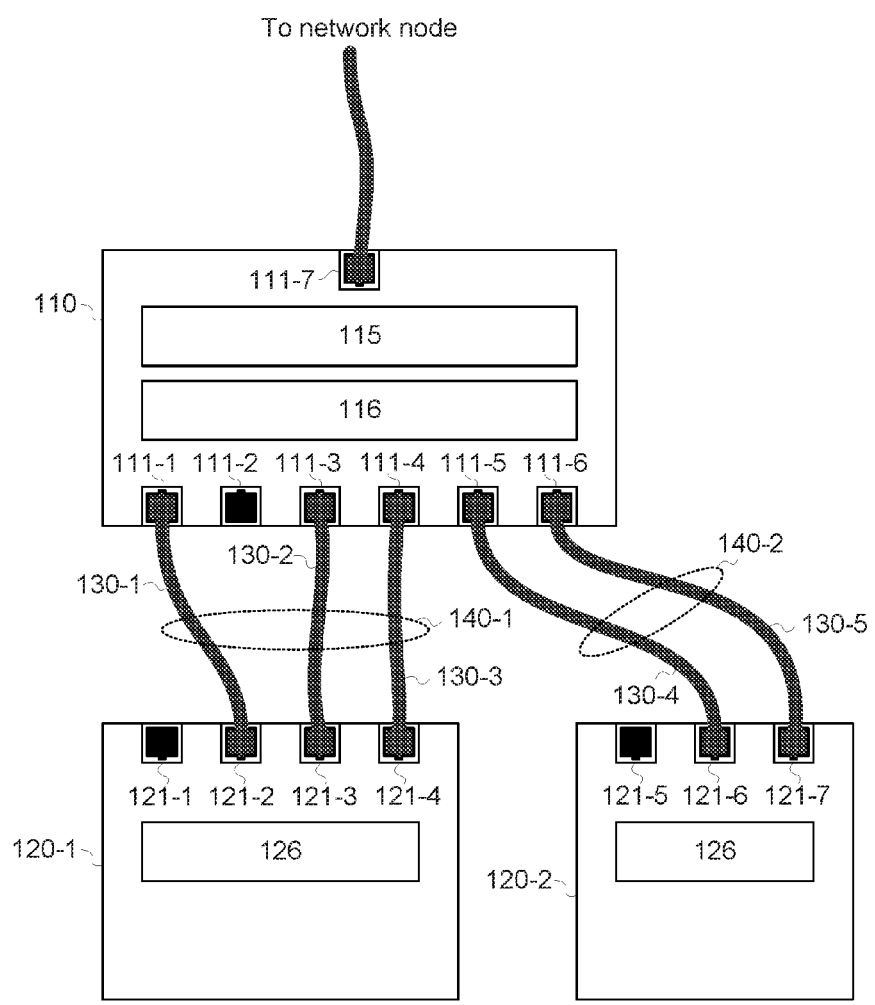
FIG. 1D is a conceptual diagram illustrating the example system in another example arrangement.

For example, consider the arrangement shown in FIG. 1D. The arrangement shown in FIG. 1D corresponds to the arrangement shown in FIG. 1B with the following change: the connectors 130-4 and 130-5 have been connected between the physical communications interfaces 111-5 and 111-6 and the physical communications interfaces 121-6 and 121-7 of the peer device 120-2. This example assumes that the connector 130-4 was connected before the connector 130-5. In response to detecting that the physical communications interface 111-5 is newly connected to the peer device 120-2, the interface controller 115 maintains the physical communications interface 111-5 in a non-aggregated configuration. The physical communications interface 111-5 is not added to the existing LAG 140-1 because the physical communications interface 111-5 is connected to peer device 120-2, while the links of LAG 140-1 are connected the peer device 120-1. A new LAG 140 is not established for the peer device 120-2 at this time, since there is still only one link to the peer device 120-2. In response to detecting that the physical communications interface 111-6 is newly connected to the same peer device as the physical communication interfaces 111-5 (i.e., peer device 120-2), the interface controller 115 automatically configures both the physical communications interfaces 111-5 and 111-6 to be included in a new LAG 140-2. For example, the interface controller 115 may automatically configure the physical communications interfaces 111-5 and 111-6 based on the same link aggregation profile as one another, which is a different link aggregation profile from the one that was used to configure physical communications interfaces 111-1, 111-3, and 111-4. This will inform the link aggregator 116 that the new LAG 140-2, which includes the physical communications interfaces 111-5 and 111-6, should be established.

Thus, a user can connect multiple peer devices 120 to the network device 110, and LAGs 140 will automatically be generated for the peer devices 120 without the user having to configure any of the physical communications interfaces 111. When connecting the multiple peer devices 120 for the first time or when adding new links or moving links between ports, the user will not have to remember which LAG 140 is associated with which peer device 120 or which physical communication interfaces 111 are included in which LAGs 140, much less go through the process of manually configuring these physical communication interfaces 111. Instead the user can simply plug new connectors 130 into any available physical communication interfaces 111 or move connectors 130 between any physical communication interfaces 111, since the interface controller 115 will automatically sort out which physical communication interfaces 111 should be included in which LAGs 140 and perform the appropriate configurations.

The interface controller 115 may also detect when links between the network device 110 and a peer device 120 are removed, and may automatically update any existing LAGs 140 accordingly. In particular, if a physical communication interface 111 that is included in an existing LAG 140 is disconnected, then the physical communication interface 111 may be configured to be removed from the LAG 140. If the LAG 140 still has two or more links despite the loss of the disconnected physical communication interface 111, the LAG 140 may be kept running. If, on the other hand, the LAG 140 has only one remaining link after the physical communication interface 111 is disconnected, then the LAG 140 may automatically be torn down by configuring the physical communication interface 111 of the remaining link to be removed from the LAG 140.

Figure 2:
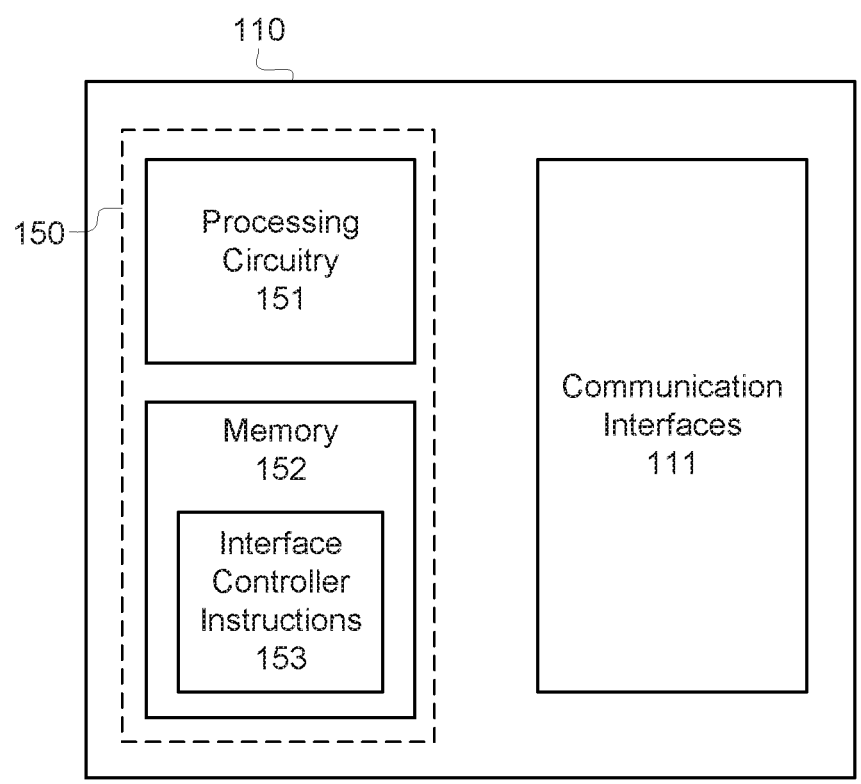
FIG. 2 is a conceptual diagram illustrating an example network device.

FIG. 2 illustrates the example network device 110. The example network device 110 may include a processing block 150 and the physical communications interfaces 111. The processing block 150 may include, for example, processing circuitry 151 and a memory 152. The processing circuitry 151 may be any circuitry capable of executing machine-readable instructions, such as a central processing unit (CPU), a microprocessor, a microcontroller device, a digital signal processor (DSP), etc. The memory 152 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The memory 152 may store machine-readable instructions that, when executed by the processing circuitry 151, cause the network device 110 to perform the operations described herein, such as the operations described in FIGS. 3-6. For example, the memory 153 may include interface controller instructions 153, which may include instructions to perform any of the operations described herein in relation to the interface controller 115. The memory 152 may be one example of the non-transitory computer readable medium 1000 illustrated in FIG. 7, in which case the interface controller instructions 153 would correspond to the interface controller instructions 1010. The processing block 150 may also include, in addition to or in lieu of the processing circuitry 151 and memory 152, an application-specific integrated circuit (ASIC), a field-programmable gate array (FPGA), an application-specific instruction set processor (ASIP), or the like, configured to perform certain operations described herein. As discussed above, the interface controller 115 and/or the link aggregator 116 may be instantiated by the processing block 150. For example, the interface controller 115 and/or the link aggregator 116 may be formed by the processing circuitry 151 executing instructions stored in the memory 152, which may include the interface controller instructions 153. Although only one processing circuitry 151 and one memory 152 are illustrated, multiple instances of these may be included in the network device 110.

FIG. 3 illustrates an example link aggregation profile. The link aggregation profile may include a collection of values, one for each of a collection of configuration parameters. The configuration parameters may include parameters that the link aggregator 116 uses to be configured in order to establish an LAG 140. The configuration parameters may also include additional parameters that are related to link aggregation. The configuration parameters include at least a parameter for identifying the LAG 140 to which the physical communications interface 111 is to be assigned. When the link aggregator 116 implements LACP, the parameter for identifying the LAG 140 may be an LACP key (also referred to herein as a group ID). Other example parameters that may be included in the link aggregation profile may include LACP mode (active vs passive), LACP System Priority, timeout (long vs short), and independent state (enabled vs disabled).

Figure 4:
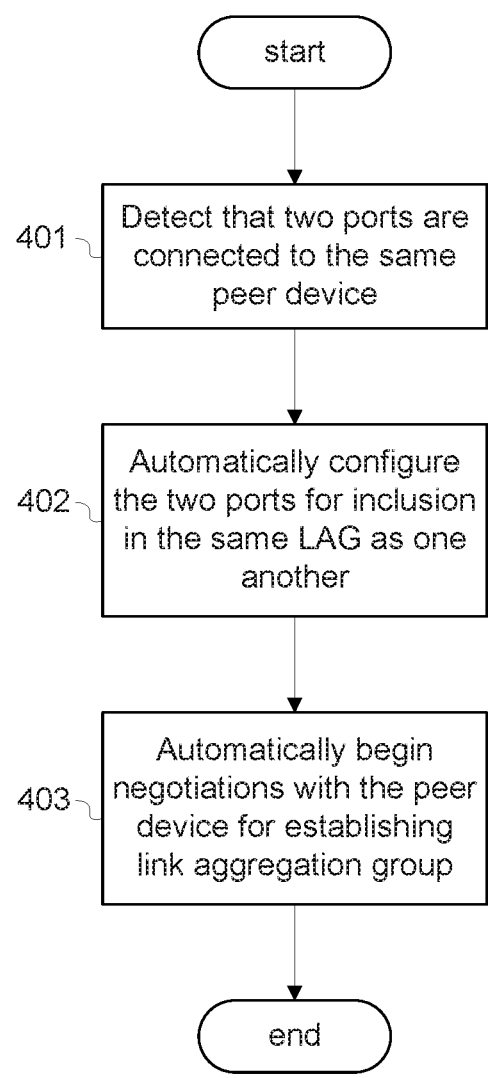
FIG. 4 is a process flow diagram illustrating an example process.

FIG. 4 illustrates an example process for configuring physical communication interfaces 111 for link aggregation. The example process may be performed, for example, by the processing block 150. For example, the memory 152 may store machine-readable instructions that, when executed by the processing circuitry 151, cause the operations of the example process to be performed.

In block 401, it is detected that two physical communication interfaces 111 are connected to the same peer device 120 as one another. These communication interfaces 111 will be referred to below as port_A and port_B.

In block 402, in response to the detection of block 401, port_A and port_B are automatically configured to be included in the same LAG 140 as one another. The operation of block 402 may include, for example, automatically determining a link aggregation group profile for port_A and port_B, and then automatically applying the profile to port_A and port_B. Determining the link aggregation profile for port_A and port_B may include selecting a profile from among a set of pre-established profiles and assigning it to port_A and port_B. Determining the link aggregation profile for port_A and port_B may also include generating a new profile for port_A and port_B. Applying the profile to port_A and port_B may include configuring certain parameters of port_A and port_B based on the values set in the profile for those parameters.

References herein and in the appended claims to an operation being performed "automatically" in response to some condition mean that further user action after fulfillment of the condition is not required for the operation to be performed. User actions that occur prior to the recited condition being fulfilled do not keep the action from being automatic, even if the user action is a necessary antecedent for the operation. Thus, to use the operation of block 402 as an example, the fact that a user may plug a connector 130 into a physical communications interface 111 (a user action) does not keep the subsequent configuration of the ports from being automatic, because the user action occurred prior to the recited condition (the detection of block 401). As another example, a user may need to first globally enable link aggregation (a user action) before the operations described herein may be performed, but this does not prevent the subsequent configuration of the ports from being automatic, because the user action occurred prior to the recited condition (the detection of block 401).

In block 403, negotiations with the peer device for establishing a LAG 140 that includes the links associated with port_A and port_B are automatically begun. This may include, for example, sending a message to the peer device related to establishing the LAG 140.

For example, block 403 may include sending LACP packets to the peer device via port_A and port_B whose content is based on the configuration of the ports, which will indicate to the peer device that the network device 110 desires to aggregate the links into an LAG 140. If the peer device is able and willing to participate in the aggregation, the peer device may send LACP packets back to the network device 110 via its interfaces that are connected to port_A and port_B, which may enable the LAG 140 to be established.

Figure 5:
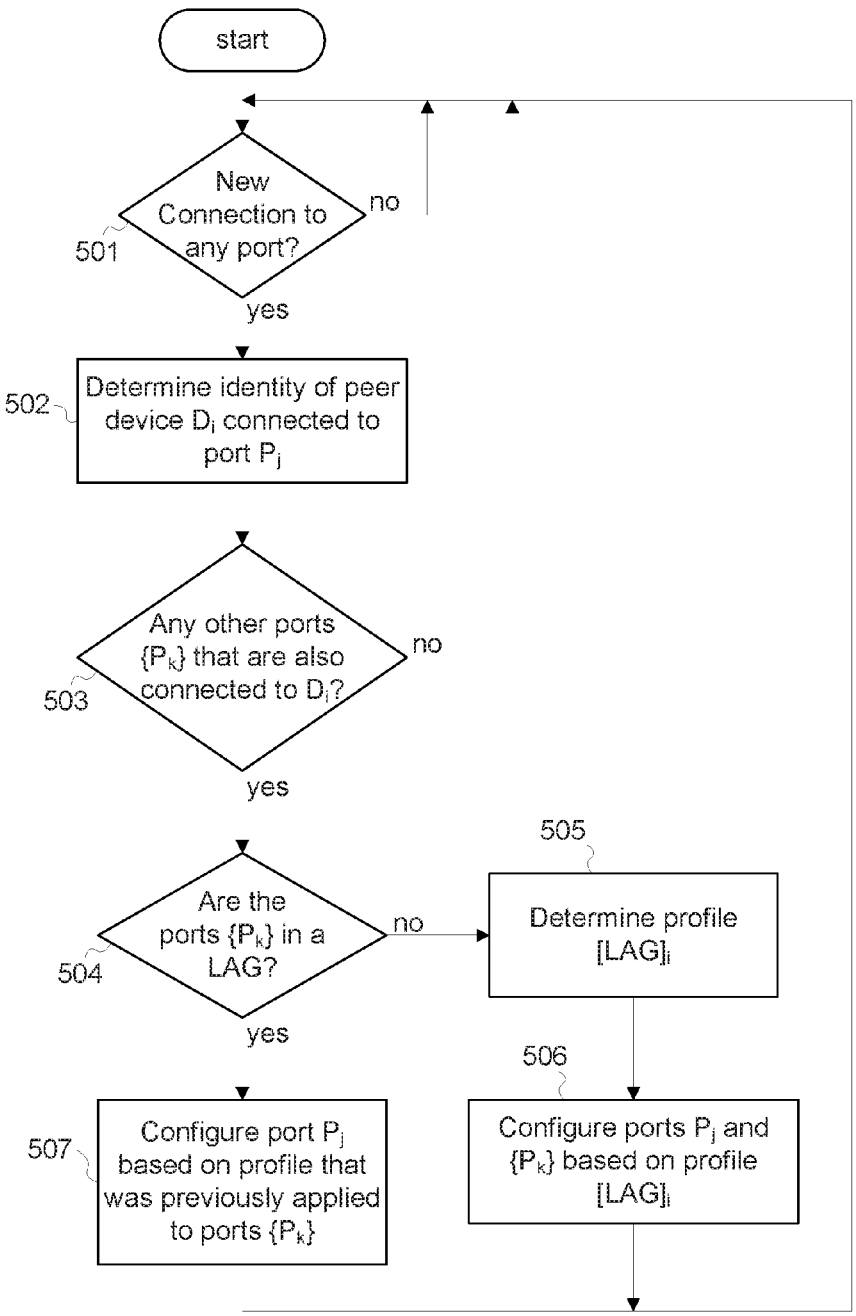
FIG. 5 is a process flow diagram illustrating another example process.

FIG. 5 illustrates another example process for configuring physical communication interfaces 111 for link aggregation. The example process may be performed, for example, by the processing block 150. For example, the memory 152 may store machine-readable instructions that, when executed by the processing circuitry 151, cause the operations of the example process to be performed.

In block 501, the physical communication interfaces 111 are monitored, and when a new connection to one of the physical communication interfaces 111 is detected (block 501=YES), the process proceeds to block 502. The physical communication interface 111 for which a new connection was detected is referred to as port PI in FIG. 5.

In block 502, the identity of the peer device 120 that port $P_j$ is connected to is determined. The peer device 120 that port $P_j$ is connected to is referred to as $D_i$ in FIG. 4. For example, LLDP may be used to identify the peer device $D_i$.

In block 503, it is determined whether any of the physical communication interfaces 111 are also connected to peer device $D_i$. The set of all physical communication interfaces 111 that are connected to peer device $D_i$, excluding port $P_j$, is referred to as $\{P_k\}$ in FIG. 5.

If there are no other physical communication interfaces 111 besides the port $P_j$ that are connected to peer device $D_i$(block 503=NO), then no further actions are taken with regard to the port $P_j$ at this time, and the process returns to block 501 to continue monitoring for new connections. When block 503 is answered NO, this corresponds to the case in which the port $P_j$ was the first port connected to the peer device $D_i$. Since there is only one link with the peer device $D_i$ in this case, no LAG 140 is to be formed that includes the port $P_j$.

If there is at least one other physical communication interface 111 besides the port $P_j$ that is connected to the peer device $D_i$ (block 503=YES), then the process proceeds to block 504. When block 503 is answered YES, this corresponds to the case in which there are multiple links with the peer device $D_i$. Thus the process proceeds to configure the port $P_j$ for aggregation into a LAG 140 (whether that be joining an existing LAG 140, or creating a new LAG 140).

In block 504, it is determined whether the links associated with the ports $\{P_k\}$ are already aggregated in an LAG 140.

If the links associated with the ports $\{P_k\}$ are not already aggregated in an LAG 140 (block 504=NO), then the process proceeds to block 505. When block 504 is answered NO, this generally corresponds to the case in which there is only one port $P_k$ that was already connected to the peer device $D_i$ when the port $P_j$ was newly connected. This is so because generally an LAG 140 would already exist if more than one port were already connected to the peer device $D_i$ prior to the new connection to port $P_j$.

If the links associated with the ports $\{P_k\}$ are already aggregated in an LAG 140 (block 504=YES), then the process proceeds to block 507. When block 504 is answered YES, this corresponds to the case in which there are two or more ports $\{P_k\}$ that were already connected to the peer device $D_i$ before the port $P_k$ was newly connected. This is so because the LAG 140 would not already exist if there were not already at least two existing links with the peer device $D_i$.

In block 505, a link aggregation profile $[LAG]_i$ is determined for the ports $\{P_k\}$ and $P_j$ that are connected to the device $D_i$.

In block 506, the link aggregation profile $[LAG]_i$ that was determined in block 505 is applied to the ports $P_j$ and $P_k$. In particular, the ports $P_j$ and $P_k$ are configured based on the profile $[LAG]_i$. The reason that the port $P_k$ is configured in addition to the port $P_j$ is because the port $P_k$ was not previously included in an LAG 140 (recall that block 506 is only reached if the port $P_k$ was not previously included in an LAG 140).

In block 507, the port $P_j$ has the same profile applied to it that was previously applied to the ports $\{P_k\}$. Recall that if block 507 is reached, then the ports $\{P_k\}$ were already aggregated into an LAG 140, and hence they would have already been configured based on a particular profile. Thus, if the profile that was used to configure the ports $\{P_k\}$ is represented as $[LAG]_i$, then the port $P_j$ is configured based on the profile $[LAG]_i$. The reason that the ports $\{P_k\}$ do not necessarily need to be configured in block 507 is that they have already been configured to be in the LAG 140. If for some reason one of the ports $\{P_k\}$ is not already included the LAG 140, then it too may be configured based on the profile $[LAG]_i$.

Figure 6:
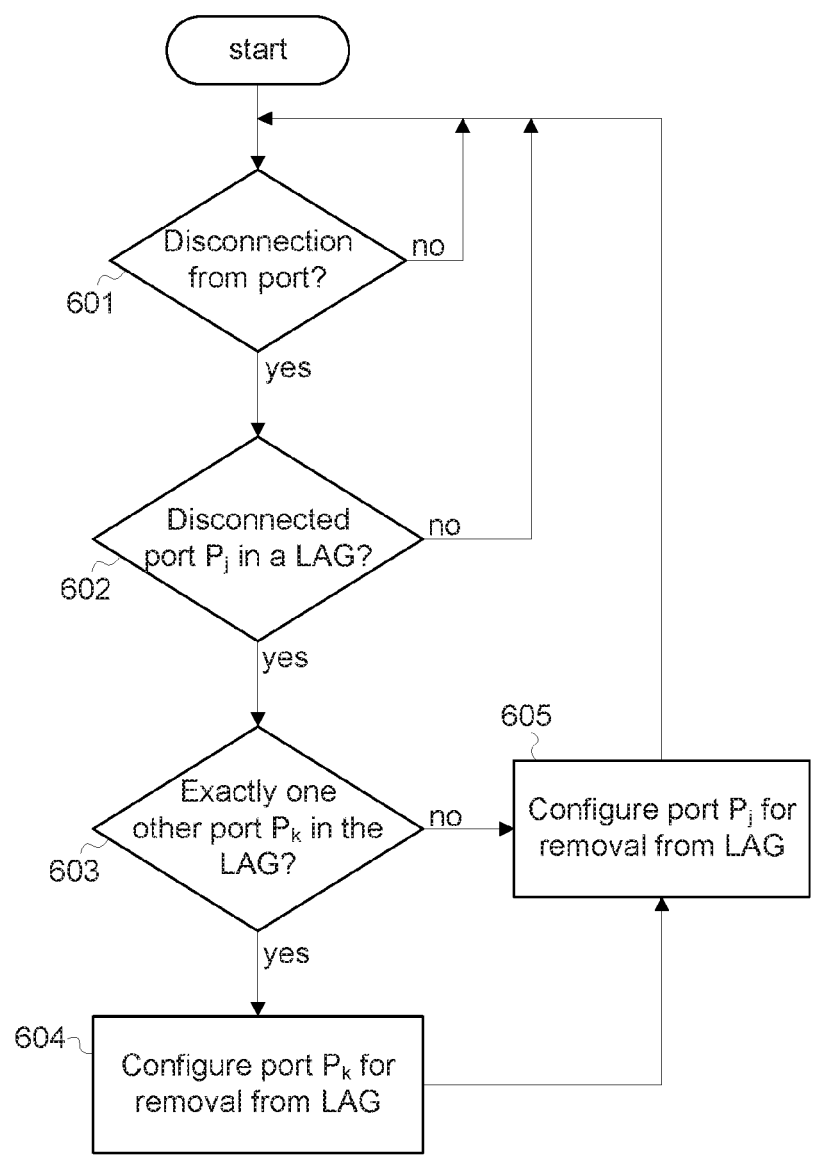
FIG. 6 is a process flow diagram illustrating another example process.

FIG. 6 illustrates an example process for handling physical communication interfaces 111 that are part of an LAG 140 being disconnected. The example process may be performed, for example, by the processing block 150. For example, the memory 152 may store machine-readable instructions that, when executed by the processing circuitry 151, cause the operations of the example process to be performed.

In block 601, the physical communication interfaces 111 are monitored, and when it is detected that one of the physical communication interfaces 111 has been disconnected from a peer device 120 (block 501=YES), the process proceeds to block 602. The physical communication interface 111 that was disconnected from a peer device 120 is referred to as port $P_j$ in FIG. 5.

In block 602, it is determined whether the port $P_j$ was in an LAG 140. If the port $P_j$ was not in an LAG 140 (block 602=NO), then no further configuration of the port $P_j$ is done at this time, and the process returns to block 601 to monitor for new disconnections. If the port $P_j$ was in an LAG 140 (block 602=YES), then the process proceeds to block 603.

In block 603, it is determined whether there is exactly one other physical communication interface 111 that is in the same LAG 140 as the port $P_j$. The exactly one other physical communication interface 111 that is in the same LAG 140 as the port $P_j$ (assuming there is one), is referred to as the port $P_k$ in FIG. 6.

If there is exactly one other port $P_k$ in the LAG 140 (block 603=YES), then both the port $P_k$ and the port $P_j$ are configured for removal from the LAG 140. In particular, the process proceeds to block 604 in which the port $P_k$ is configured for removal from the LAG 140, and then to block 605 in which the port $P_j$ is configured for removal from the LAG 140. The port $P_j$ is removed from the LAG 140 because it is no longer connected to the peer device 120 that is associated with the LAG 140. The port $P_k$ is also removed from the LAG 140 because it is now the only physical communications interface 111 that is still connected to the peer device 120 associated with the LAG 140, and hence the LAG 140 needs to be torn down.

If there are more than one other ports in the LAG 140 (block 603=NO), then the process proceeds to block 605 and port $P_j$ is configured for removal from the LAG 140. The other ports in the LAG 140 do not need to be configured for removal from the LAG 140, because there are still at least two ports connected to the peer device 120 associated with the LAG 140.

In blocks 604 and 605, the configuring of the various physical communication interfaces 111 for removal from a LAG 140 may include, for example, returning the link aggregation parameters of the physical communication interfaces 111 to the values they had prior to being configured to join the LAG 140, configuring the physical communications interfaces 111 based on default values for non-aggregated ports, or the like.

Figure 7:
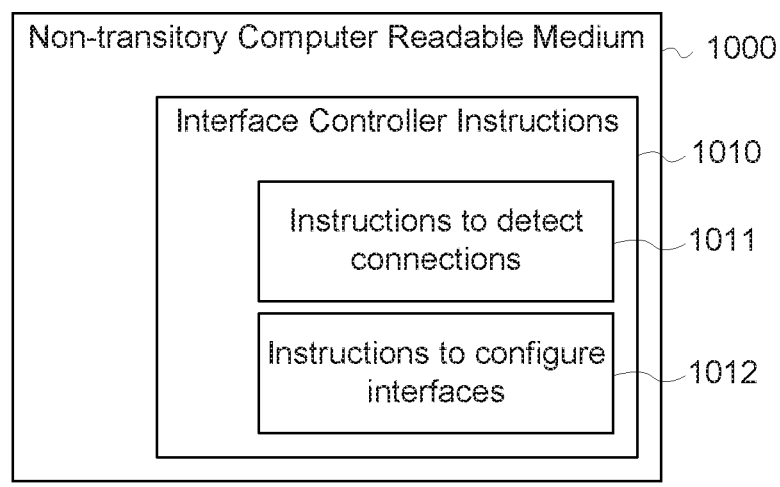
FIG. 7 is a conceptual diagram illustrating an example non-transitory computer readable medium.

FIG. 7 illustrates an example non-transitory computer readable medium 1000. The non-transitory computer readable medium 1000 may include volatile storage media (e.g., DRAM, SRAM, etc.) and/or non-volatile storage media (e.g., PROM, EPROM, EEPROM, NVRAM, hard drives, optical disks, etc.). The non-transitory computer readable medium 1000 may store machine-readable instructions that are configured to, when executed by processing circuitry (such as the processing circuitry 151) of a network device (such as the network device 110), cause the network device to perform operations described above, such as the operations described in FIGS. 3-6. The memory 152 may be one example of the non-transitory computer readable medium 1000.

For example, the non-transitory computer readable medium 1000 may include interface controller instructions 1010. The interface controller instructions 1010 may be to implement certain operations described above as being performed by the interface controller 115. For example, the interface controller 115 described above may be instantiated by processing circuitry (such as the processing circuitry 151) executing the interface controller instructions 1010. The interface controller instructions 1010 may include, for example, instructions to detect connections 1011 and instructions to configure interfaces 1012. The interface controller instructions 1010 may include additional instructions (not illustrated) to implement any or all of the operations described in FIGS. 3-6.

The instructions to detect connections 1011 may include, for example, instructions to monitor physical communications interfaces (such as the physical communications interfaces 111) of a communication device (such as the network device 110) for connections to peer devices (such as the peer devices 120).

The instructions to configure interfaces 1012 may include, for example, instructions to, in response to detecting that at least two of the physical communications interfaces are connected to a same peer device as one another, automatically configure the at least two of the physical communications interfaces for aggregation into a same link aggregation group as one another.

Although the discussion above focuses on aggregation of links between the peer device 120 and the network device 110, the same processes described above could be used to configure links with the other network node. In fact, in some example configurations, the other network node may simply be considered as another peer device 120 for purposes of the processes described above.

The foregoing describes techniques for automatically configuring physical communication interfaces for link aggregation. While the above disclosure has been shown and described with reference to the foregoing examples, it should be understood that other forms, details, and implementations may be made without departing from the spirit and scope of this disclosure.

We claim:
1. A communications device comprising:
physical communication interfaces;
processing circuitry; and
a non-transitory machine-readable medium comprising instructions that, when executed by the processing circuitry, cause the communications device to:
detect that a first interface and a second interface of the physical communications interfaces are both connected to a first peer device and in response thereto automatically and independently of receipt of any link aggregation packets:
determine a first link aggregation group profile, and configure the first and second interfaces for aggregation into a first link aggregation group based on the first link aggregation group profile;
begin negotiations with the first peer device for establishment of the first link aggregation group; and
in response to detecting that one of the physical communications interfaces has disconnected from a peer device to which it was previously connected, automatically configuring the one of the physical communications interfaces for removal from a link aggregation group comprising those of the physical communications interfaces that are connected to the respective peer device.

2. The communications device of claim 1, wherein the instructions are to cause the communications device to:
detect that a third interface of the physical communications interfaces is connected to the first peer device after the first link aggregation group has been established, and in response thereto automatically:
configure the third interface for joining the first link aggregation group based on the first link aggregation group profile; and
begin negotiations with the first peer device for the third interface to join the first link aggregation group.

3. The communications device of claim 1,
wherein the first link aggregation profile includes:
a group identifier parameter that is set to a first group identifier, and
an LACP mode parameter that is set to active.

4. The communications device of claim 1, wherein the instructions are to cause the communications device to:
detect that a third interface and a fourth interface of the physical communications interfaces are connected to a second peer device after the first link aggregation group has been established and in response thereto automatically:
determine a second link aggregation group profile, and
configure the third and fourth interfaces for aggregation into a second link aggregation group based on the second link aggregation group profile; and
begin negotiations with the second peer device for establishment of the second link aggregation group.

5. The communications device of claim 1, wherein the instructions are to cause the communications device to:
detect that the first interface is no longer connected to the first peer device after the first link aggregation group has been established, and in response thereto automatically configure the first interface for removal from the first link aggregation group.

6. The communications device of claim 1, wherein the instructions are to cause the communications device to:
any time that one of the physical communications interfaces is newly connected to the first peer device while the first link aggregation group is established, automatically:
configure the respective physical communications interface for joining the first link aggregation group based on the first link aggregation group profile; and
begin negotiations with the first peer device for joining the respective physical communications interface to the first link aggregation group.

7. The communications device of claim 1, wherein the instructions are to cause the communications device to:
any time that one of the physical communications interfaces that are part of the first link aggregation group is newly disconnected from the first peer device, automatically configure the respective physical communications interface for removal from the first link aggregation group.

8. A communications device comprising:
physical communication interfaces;
processing circuitry; and
a non-transitory machine-readable medium comprising instructions that, when executed by the processing circuitry, cause the communications device to:
whenever one of the physical communications interfaces is newly connected to a peer device to which any other of the physical communications interfaces are already connected, automatically and independently of receipt of any link aggregation packet: configure each one of the physical communications interfaces that is connected to the respective peer device for aggregation into a same link aggregation group; and
whenever one of the physical communications interfaces is newly disconnected from a peer device to which exactly one other of the physical communications interfaces is connected, automatically: configure both the one of the physical communications interfaces and the exactly one other of the physical communications interfaces for removal from a link aggregation group that comprises those of the physical communications interfaces that are connected to the respective peer device.

9. The communications device of claim 8, wherein the instructions are to cause the communications device to:
whenever one of the physical communications interfaces is newly disconnected from a peer device to which any other of the physical communications interfaces are connected, automatically: configure the one of the physical communications interfaces for removal from a link aggregation group that comprises those of the physical communications interfaces that are connected to the respective peer device.

10. The communications device of claim 8, wherein the instructions are to cause the communications device to:
whenever one of the physical communications interfaces is newly disconnected from a peer device to which at least two other of the physical communications interfaces are connected, automatically: configure the one of the physical communications interfaces for removal from a link aggregation group that comprises those of the physical communications interfaces that were connected to the respective peer device, while maintaining the at least two other of the physical communications interfaces in a same link aggregation group.

11. A non-transitory computer readable medium comprising instructions that, when executed by a processor of a communications device, cause the communications device to:
monitor physical communications interfaces of the communications device for connections to peer devices;
in response to detecting, independently of receipt of any link aggregation packet, that at least two of the physical communications interfaces are connected to a same peer device as one another, automatically configure the at least two of the physical communications interfaces for aggregation into a same link aggregation group as one another; and
in response to detecting that one of the physical communications interfaces has disconnected from a peer device to which it was previously connected, automatically configuring the one of the physical communications interfaces for removal from a link aggregation group comprising those of the physical communications interfaces that are connected to the respective peer device.

12. The non-transitory computer readable medium of claim 11,
wherein the automatically configuring the at least two of the physical communications interfaces for aggregation into a same link aggregation group as one another includes setting a group identifier parameter of the at least two of the physical communications interfaces to a same group identifier and setting an LACP mode parameter of the at least two of the physical communications interfaces to active.

13. The non-transitory computer readable medium of claim 11, wherein the instructions are to cause the communications device to:
   in response to detecting that one of the physical communications interfaces is newly connected to a peer device when at least two others of the physical communications interfaces are already connected to the respective peer device, automatically configure the one of the physical communications interfaces for joining a link aggregation group that comprises the at least two others of the physical communications interfaces.

* * * * *